H. P. KRAFT.
PUMP COUPLING.
APPLICATION FILED MAR. 29, 1920.
1,383,126. Patented June 28, 1921.
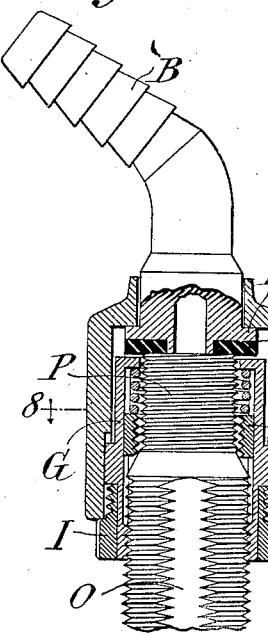
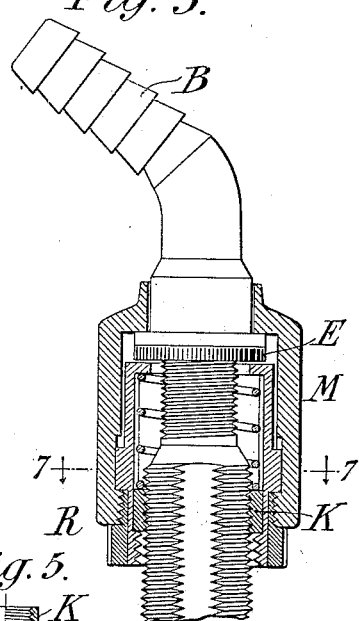
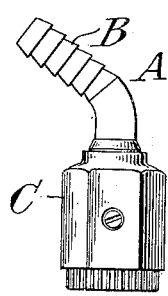
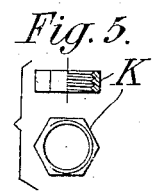
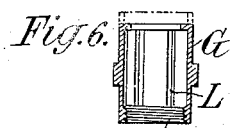
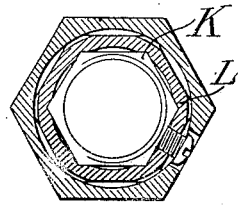
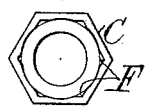
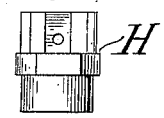
INVENTOR
Henry P. Kraft
By Attorneys,
Frau Fink Myers

UNITED STATES PATENT OFFICE.

HENRY P. KRAFT, OF RIDGEWOOD, NEW JERSEY.

PUMP-COUPLING.

1,383,126.

Specification of Letters Patent.   Patented June 28, 1921.

Application filed March 29, 1920. Serial No. 369,588.

*To all whom it may concern:*

Be it known that I, HENRY P. KRAFT, a citizen of the United States of America, residing at Ridgewood, in the county of Bergen and State of New Jersey, have invented certain new and useful Improvements in Pump-Couplings, of which the following is a specification.

This invention relates to pump couplings for pneumatic tire valves or the like, and aims to provide certain improvements therein.

Generally speaking, the standard tire valve for automobiles is made in two sizes with regard to diameter, namely No. 777 and No. 725. No. 777 valve is formed with a body which is of considerably less diameter than that of No. 725. Heretofore a single pump coupling has been enabled to engage both sizes of valves on account of the fact that the nipples of these valves are of the same external and internal diameter. Another type of valve has been added which has a body portion of the same diameter as No. 725, but in this type the nipple is enlarged in diameter, the valve being constructed for use in connection with truck tires of large cross-section.

The principal object of the present invention is to provide a pump coupling which will engage the three types of valve first described, but in contradistinction to engaging the nipples will engage the body portions thereof. According to the preferred form of the invention, I provide a coupling which will engage the body portions of the several valves and press the nipples against the packing. The invention also includes certain other features of improvement which will be hereinafter more fully described.

Referring to the drawings which illustrate one form of the invention,—

Figure 1 is an elevation of the coupling.

Fig. 2 is an enlarged view showing parts of the coupling in diametrical section and showing the coupling as engaging a truck tire valve.

Fig. 3 is a similar view showing the coupling engaging a No. 725 valve.

Fig. 4 is a diametrical section of the swiveled member of the coupling.

Fig. 5 illustrates two views of one of the nuts.

Fig. 6 is a diametrical section of the other nut.

Fig. 7 is a cross-section on the line 7—7 in Fig. 3.

Fig. 8 is a cross-section on the line 8—8 in Fig. 2.

Fig. 9 is an underside view of Fig. 4.

Fig. 10 is an elevation of one of the inside parts.

Fig. 11 is an underside view of Fig. 10.

Fig. 12 is a top view of Fig. 10.

Referring to the drawings, let A indicate the coupling as a whole, which comprises essentially a shank B and a body portion C. Preferably the body portion is swiveled on the shank B, the shank being provided with an internal flange D, which fits against a corresponding internal shoulder on the body portion C. Immediately beneath the flange D is arranged a packing washer E, against which the nipples of the valves are pressed when the coupling is screwed down in place upon them.

Within the body portion C are arranged two nuts, both of which are non-rotatively connected with the body portion. These nuts are of different internal diameters, the inner nut being the smaller one and being preferably arranged to move bodily within the body portion for a purpose to be described.

Any means of non-rotative connection may be provided, but I prefer that shown in Fig. 4, wherein the body portion C is provided with drifts F, preferably six in number, which are designed to receive the corners of the nut G, shown in section in Fig. 6 and in elevation bottom and top views in Figs. 10 and 12, respectively. By reference to Fig. 10 it will be seen that the nut is provided with a collar H preferably integral therewith, which collar has formed upon it faces resembling the ordinary hexagonal nut. The corners of these faces project into the drifts F shown in Fig. 4.

Referring to Figs. 2 and 3, it will be seen that the nut G is held in position within the body of the coupling by a screw-threaded collar I, whose function it is merely to hold the nut longitudinally in place.

The inner nut K, which is of smaller diameter than the nut G, is mounted to slide or reciprocate in the body of the coupling and in the construction shown it reciprocates within the nut G. The construction of the nut K is illustrated in Fig. 5, it having the usual hexagonal exterior, the points of which are adapted to slide in drifts L formed on the interior of the nut G, as will be best seen in Figs. 6 and 8.

The nut K is constantly urged to its lowermost position within the nut G by a spring M, the normal position being illustrated in Fig. 3. In Fig. 2, I have illustrated the coupling as applied to a truck tire valve O having an enlarged nipple P. As applied to such a valve, the screw-threaded portion Q of the nut G engages the exterior of the body portion of the truck tire valve, the nipple P extending through the smaller nut K without engaging it, the nut riding up idly from the position shown in Fig. 3 to that shown in Fig. 2. The top of the nipple is pressed against the packing E.

In Fig. 3, wherein I have shown the coupling as applied to a 777 valve, the smaller nut K is engaged by the exterior of the valve casing and the nipple as before extends upwardly and contacts with the packing E.

In the case of the 725 valve, the connection is similar to that shown in Fig. 2, the lower nut G engaging the exterior of the casing and the nipple projecting upwardly to contact with the packing E, carrying with it the nut K.

It will be observed that the function of the spring M is to press the lower nut downwardly, so that it is in a position to engage the threads of the exterior of the small valve, while at the same time rendering the nut yielding so that it may be lifted upwardly by the larger valves. If the nut K were fixed in the position of Fig. 2, it could not be engaged by the threads of the smaller valve. When so engaged, as shown in Fig. 3, the lower side of the nut K presses against an internal shoulder R formed on the nut G, and thus gains a reaction point when the 777 valve is being pressed against the packing.

While I have shown and described several embodiments of the invention, it will be understood that I do not wish to be limited thereto since various changes may be made therein without departing from the spirit of the invention.

What I claim is:—

1. A pump coupling having an internal nut for engaging the exterior of the body of a tire valve casing, and a second internal nut for engaging the exterior of the body of a tire valve casing of smaller diameter than the first, and a packing spaced apart from said nuts, the coupling being adapted to receive a nipple of a tire valve between said nuts and said packing.

2. A pump coupling having two internal nuts non-rotatively connected therewith, one of said nuts being slidably mounted.

3. A pump coupling having two internal nuts non-rotatively connected therewith, one of said nuts being slidably mounted, and a spring for pressing said slidably mounted nut downwardly.

4. A pump coupling having a lower nut arranged within it and adapted to engage the body portion of a valve of large dimensions and an upper nut arranged within it adapted to engage the body of a tire valve of smaller dimensions, the upper nut being slidably mounted within the coupling.

5. A pump coupling having a lower nut arranged within it and adapted to engage the body portion of a valve of large dimensions and an upper nut arranged within it adapted to engage the body of a tire valve of smaller dimensions, the upper nut being slidably mounted within the coupling, and a spring for normally pressing the upper nut downwardly.

6. A pump coupling having nuts of two internal diameters, said nuts and pump coupling being provided with non-rotative connections, and the nuts being separable from the body of the coupling.

7. A pump coupling having two nuts of different diameters, the larger nut and body of the coupling being provided with a non-rotative connection, and the larger nut and smaller nut being provided with a non-rotative connection.

8. A pump coupling having a large nut and a small nut non-rotatively and separably connected thereto.

9. A pump coupling having a large nut and a small nut, the small nut being slidingly mounted in the large nut and non-rotatively connected thereto.

In witness whereof, I have hereunto signed my name.

HENRY P. KRAFT.